Aug. 19, 1969   K. C. ALLEN   3,461,985
WEIGHER WITH AUTOMATIC TICKET ISSUING MECHANISM
Filed May 22, 1962   2 Sheets-Sheet 1

INVENTOR.
KENNETH C. ALLEN
BY
Marechal, Biebel, French & Bugg

Aug. 19, 1969     K. C. ALLEN     3,461,985
WEIGHER WITH AUTOMATIC TICKET ISSUING MECHANISM
Filed May 22, 1962
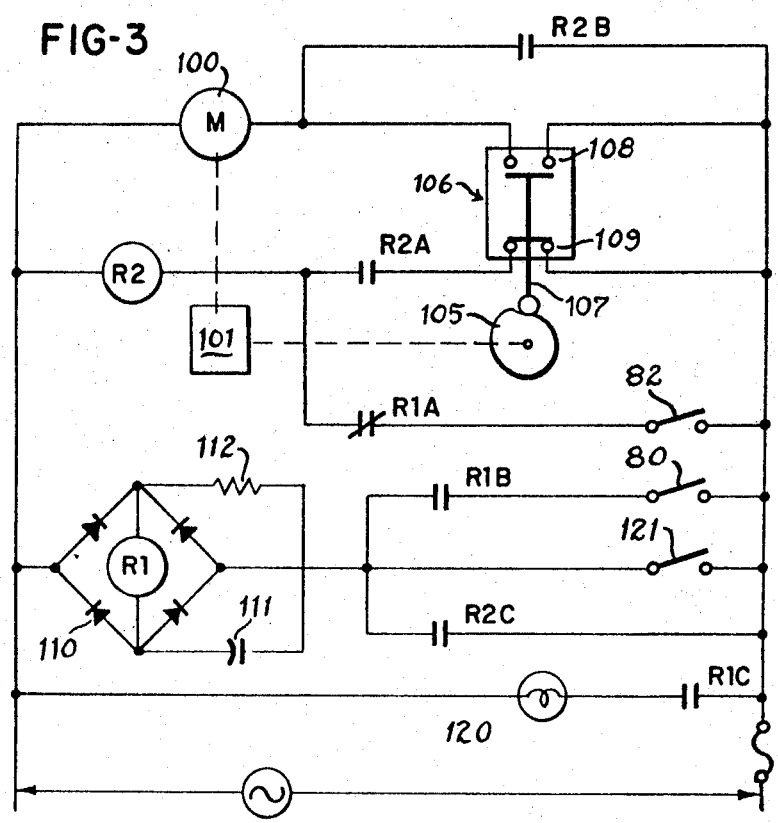
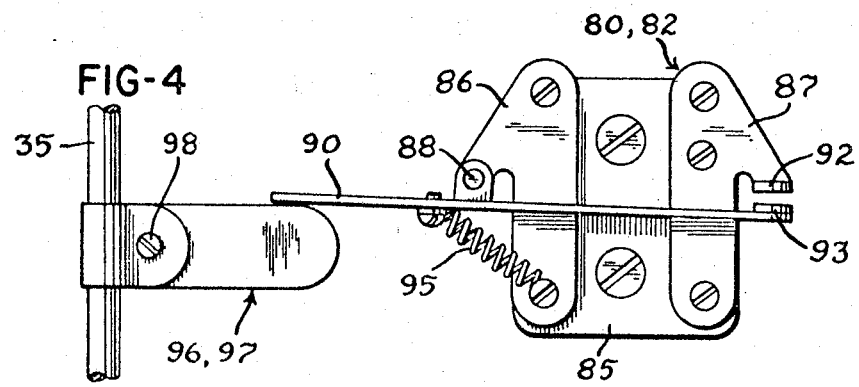
INVENTOR.
KENNETH C. ALLEN

United States Patent Office 3,461,985
Patented Aug. 19, 1969

3,461,985
WEIGHER WITH AUTOMATIC TICKET
ISSUING MECHANISM
Kenneth C. Allen, Dayton, Ohio, assignor to The Hobart Manufacturing Company, Troy, Ohio, a corporation of Ohio
Filed May 22, 1962, Ser. No. 196,696
Int. Cl. G01g 23/38
U.S. Cl. 177—7       5 Claims This invention pertains to weighing scales and more particularly to person weighing scales.

An important object of this invention is the provision of a person weighing scale including an electric control circuit for operating a ticket issuing mechanism to issue a ticket for each weighing thereon. The control circuit of this invention prevents unintentional repeat operations assuring that only one ticket is issued for each weighing on the scale.

A further object of this invention is the provision of a person weighing scale of compact and simplified construction including a transversely arranged lever arm arranged for tangential operation of an inclined draft rack and a centrally positioned chart hub.

Another object of this invention is the provision of a person weighing scale including a ticket issuing mechanism control operated by the movement of the scale platform which assures that only a single ticket is issued with each weighing and prevents intentional repeat operation of the ticket issuing mechanism as might be caused by a person jumping on the scale platform, and which prevents the issuance of a ticket when a child steps onto the scale.

Other objects and advantages of the invention will be apparent from the following description, the accompanying drawings and the appended claims.

In the drawings:

FIG. 3 is a wiring diagram of the control circuit of this invention; and

FIG. 4 is an enlarged fragment of a portion of FIG. 2 showing one of the control switches and a fragment of the draft rod.

Figure 1:
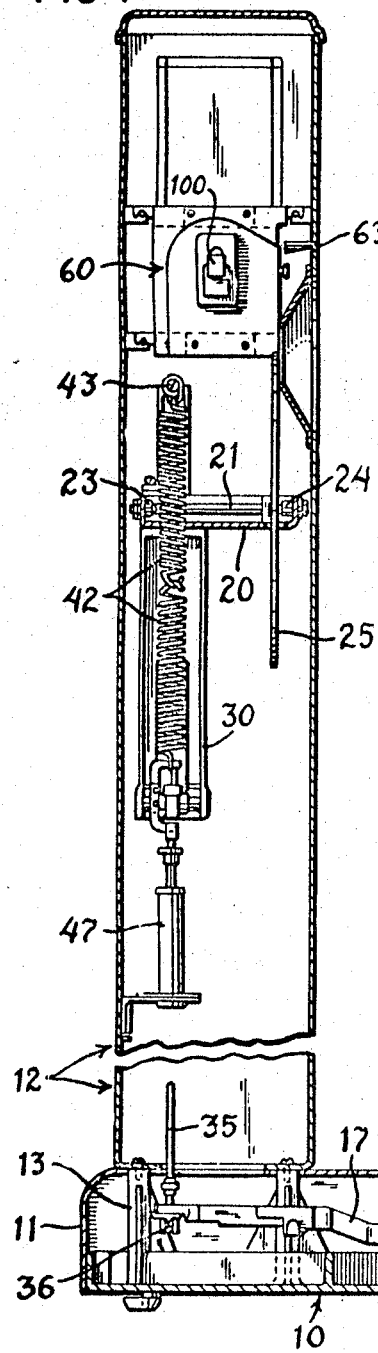
FIG. 1 is a partially broken away side elevation of a scale constructed according to this invention.
Figure 2:
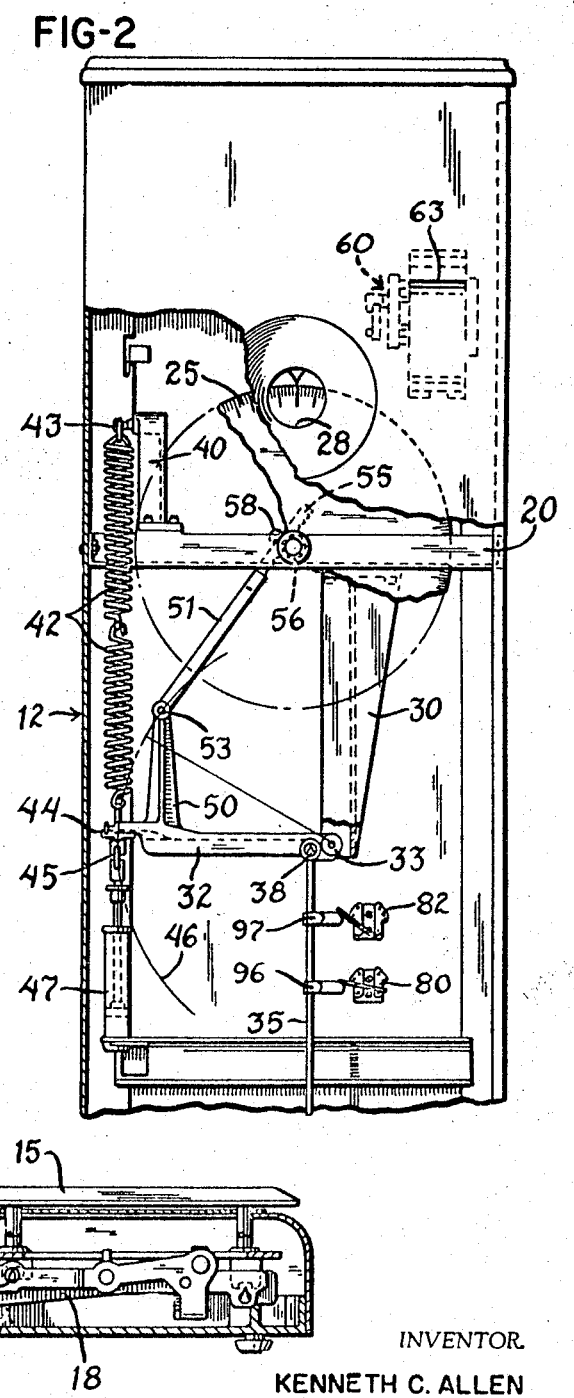
FIG. 2 is a partially broken away front elevation of the scale of FIG. 1.

Referring to the figures of the drawing which illustrate a preferred embodiment of the invention, a scale constructed according to the teachings of this invention is illustrated in FIGS. 1 and 2 as including a cast base 10 within a housing 11. An upright scale column 12 is supported directly on upwardly extending support portions 13 of the base 10, adjacent to a weighing platform 15. The weighing platform 15 is connected to move a scale lever mechanism 16 supported on the base 10 within the housing 11. The mechanism 16 is preferably of the double-lever type, with a main lever 17 and a secondary lever 18, as shown and described in the United States patent to Meeker et al., 2,649,293, of Aug. 19, 1953, and assigned to the same assignee as this application.

The column 12 has a transverse chart and spring supporting frame 20 mounted therein. A chart hub or shaft 21 is rotatably mounted on the frame 20 and aligned fore and aft in the column 12 and supported on adjustable pilot bearings 23 and 24, one at each end thereof. The shaft 21 supports a circular scale chart 25 for rotation therewith, a portion of the chart 25 being viewable for reading through a front window opening 28 formed in the cabinet front of the column 12.

The frame 20 includes lever supporting means in the form of a cast transverse lever hanger 30 which has an upper and fastened to bottom of the frame 20 and depending downwardly therefrom. The hanger 30 supports a transverse lever 32 which has one end thereof pivotally mounted at 33 on the hanger 30 and extends generally transversely of the column 12 to one side thereof. Means for connecting the transverse lever 32 to the nose iron of the main lever 17 of the mechanism 16 includes a draft rod 35 which has a lower end forming a knife-edge connection 36 to the lever 17, and an upper end pivotally connected to the lever 32 by another knife-edge connection 38, for effecting arcuate movement of this lever with corresponding movement of the platform 15.

The frame 20 also includes spring supporting means in the form of an upright spring supporting column 40 fixed to the upper surface of the frame 20 adjacent one side thereof. The column 40 is provided with suitable hanger means or supporting the upper end of a pair of counter-balancing springs 42. Such hanger means may include an eccentric rotatable support 43 to adjust the scale for zero indication with no weight on the platform.

The lower end of the counter-balancing springs 42 is connected to the extended end of the transverse lever 32 by means of a nose iron 44 and nose iron bearing 45, so that a line drawn through the center of the spring and the nose iron 44 is tangtnt to the arc 46 of movement of the lever 32, at one-half scale capacity. An oil filled dashpot 47 is also connected to the nose iron bearing 45 for movement with the lever 32 for damping the oscillation of the scale.

Operating means for the chart 25 includes an upwardly extending arm portion 50 formed as an integral part of the transverse lever 32. An inclined rack draft rod 51 is pivotally connected to the upper end of the arm portion 50 at a pivot 53. The rack draft rod 51 includes a rack gear 55 formed on the end thereof gravitationally engaged with a pinion gear 56 carried on the hub 21. Engagement during scale movement is assured by an adjustable pin 58 set into the frame 20 which normally clears the rack 55 but which prevents disengagement due to the tendency of the teeth to separate during movement.

The location of the pivotal connection 53 of the draft rod 51 on the lever 32 is such that, at half load, the pitch line of the teeth on the rack 55 is tangent with the arc of rotation inscribed by the pivot 53. Accordingly, a true straight-line relationship exists at half load, and at all other loads, this relationship is substantially maintained, thereby reducing as much as practicable the errors of sines and cosines. In the preferred embodiment shown, the pivot 53 lies on the same arc 46 as the nose iron pivot for the balance springs. The provision of the arm portion 50 providing a pivot 53 at the point of tangency results in a compact scale operating mechanism which is particularly adapted for the rotational movement of a centrally positioned chart shaft by a transverse lever.

The scale of this invention includes means for issuing a ticket upon each weighing thereon and accordingly is provided with a ticket issuing mechanism indicated generally at 60 in FIGS. 1 and 2. The mechanism 60 includes a ticket issuer which is described in detail and claimed in applicant's copending application Ser. No. 196,822, now Patent No. 3,153,361, filed concurrently herewith and assigned to the same assignee as this application. The mechanism 60 operates in a cycle of operation to advance a strip of tickets one ticket length for each weighing thereof, and then to sever the ticket after advancing, with an end of the ticket protruding through a slot 63 formed in the front of the cabinet 12.

The scale includes circuit means for controlling the operation of the ticket issuing mechanism 60 to assure that a single ticket is issued at each weighing and to prevent repeat operation of the mechanism 60 by reason of vibration or intentional jumping on the scale. The control circuit therefore assures that a second ticket will not be issued until substantially all of the weight is removed from the scale and is reapplied thereto, such as by a person stepping down off the platform 15 and then onto the platform again. The control mechanism of this invention also includes means for preventing automatic ticket issuing except when a weight is on the scale which is in excess of a minimum weight, to prevent ticket issuing when a small child steps onto the scale.

This control means includes a pair of switch means including a first switch which is operated with the initial movement of the weighing mechanism 16 and a second switch which is connected to be operated upon a substantially greater movement of the mechanism corresponding to a substantially greater weight on the scale than the weight required for the operation of the first switch. The first and second switch means are shown in FIG. 2 and with an enlarged detail in FIG. 4 as including a pair of single pole, normally closed switches 80 and 82 which require little force to open. Such switches are commonly known in the trade as light switches, and are often employed to turn on the light of a scale with initial platter movement.

One of the switches 80, 82 is shown in FIG. 4 as including an insulating back 85 having a pair of spaced terminal strips 86 and 87 mounted thereon. The strip 86 forms a pivot at 88 for movably supporting a switch operating leaf or lever 90. The terminal 87 has a contact 92 carried thereon for cooperation with a contact 93 carried on the end of the leaf 90. A light spring 95 may be employed to urge the contacts 92 and 93 to the normally closed position, as shown, or the leaf 90 may be weighted to urge the contacts closed.

Adjustable means on the draft rod 35 for operating the switches 80 and 82 include a pair of plastic clips 96 and 97. The clips are secured in adjusted position on the rod 35 by means of a screw 98, and extend into operating engagement with the leafs 90.

As shown in FIG. 2, both of the switches 80 and 82 are held open by the clips 96 and 97 in the balanced position of the scale corresponding to no weight on the platform 15. When a person steps on the platform, the draft rod 35 is moved downwardly and the clip 96 for switch 80 is adjusted to permit this switch to close during the initial movement of the platform. The switch 80 may, for instance, be adjusted to close at approximately five pounds weight on the scale. The switch 82 and clip 97 are adjusted to permit this switch to close at a substantially higher weight on the platform, such as, for instance, seventy-five pounds.

The switches 80 and 82 form a part of the control circuit shown in FIG. 3 for the ticket issuing mechanism 60. The mechanism 60 includes an electric motor 100 which drives an intermittent ticket advancing and severing device, indicated diagrammatically at 101, through reduction gearing. The details and operation of the device 101 are fully described in the above-mentioned copending application of Allen.

The motor 100 also drives a cam 105 which forms part of the mechanism 60, and which operates a limit switch 106 shown diagrammatically in FIG. 3 as having its operating arm 107 in engagement with the cam 105. The switch 106 includes a set of motor control contacts 108 which are closed near the end of the cycle of operation and which close a circuit to the motor 100 and cause the motor to complete its cycle of operation, at which point the circuit is broken by the cam 105 to stop the motor 100.

The contacts 109 of the switch 106 comprise a set of control contacts which are in series with a control relay R2 and a pair of normally open contacts R2A of relay R2, to control the operation thereof. As is seen in FIG. 3, relay R2 is also controlled by the switch 82 and a pair of normally closed contacts R1A of a further control relay R1. When relay R2 is operated, it initiates the operation of the motor 100 through contacts R2B and holds substantially through a cycle of operation until released by the opening of contacts 109. The contacts 108 complete the cycle of operation.

The control relay R1 is connected for operation through a rectifier bridge circuit 110 and also has connected across its operating coil an electrolytic capacitor 111 in series with a current limiting resistor 112. The capacitor and resistor form an R-C circuit providing a discharge path through the relay R1 and provide delay means for delaying the release of this relay. The relay R1 is connected for operation by a pair of contacts R2C of the control relay R2 and is held in operated condition by a parallel holding circuit including contacts R1B and the switch 80.

The circuit of FIG. 3 also includes a chart lamp 120 which is operated with relay R1 through contacts R1C when a person steps onto the scale. The circuit further includes remote disabling means in the form of a switch 121 connected to energize the relay R1 and to hold this relay energized. During the time which R1 is energized, relay R2 cannot be recycled to operate the motor 100. The switch 121 therefore provides a means for remotely controlling the ticket issuing function of the scale in this invention.

In the operation of this invention, the movement of the platform 15 caused by a person stepping onto the scale moves the main lever 17 to draw the draft rod 35 downwardly. The movement of the rod 35 is translated into arcuate movement of the lever 32 about its pivot 33, resulting in the rotation of the chart 25 by the rack 55 and the pinion gear 56.

The initial movement of the platform 15 also operates the switch 80, which has been adjusted in relation to the tab 100 to close at a low value of weight. Nothing happens in the control circuit at this time since the switch 80 is in series with the normally open contacts R1B. The platform continues to move down under the influence of the weight followed by the closing of switch 82 which has been adjusted to operate at a substantially higher value of weight.

The closing of switch 82 operates the relay R2 through normally closed contacts R1A. The operation of the relay R2 initiates the operation of the motor 100 to issue a ticket in a cycle of operation.

The closing of relay R2 also operates relay R1 through contacts R2C. Relay R1 then becomes self-holding through contacts R1B and switch 80. As soon as relay R1 is actuated, one of the parallel paths to the relay R2 is opened. The other path to relay R2 includes contacts 109 of switch 106 which open near the end of the cycle of operation to release relay R2.

Relay R1 is held in a conductive condition as long as there is sufficient weight on the scale to hold closed the switch 80. This prevents the reactivation of relay R2. Relay R1 and switch 80 provides means which block and prevent further operation of the relay R2, until the switch 80 is opened by the removal of substantially all of the weight from the scale.

When a person steps off the scale, the balance mechanism returns to its no weight balance position thereby opening the switch 80 substantially at the conclusion of its return movement and breaking the circuit to relay R1. However, R1 is further delayed in its opening by means of the capacitor discharge circuit including the capacitor 111 and the resistor 112. Accordingly, R1 may be further delayed from a fraction of a second up to several seconds, depending upon the capacity of the R-C circuit, thereby preventing the reoperation of relay R2 and the issuance of another ticket as would occur by intentional jumping on the scale platform. The circuit of this invention thus assures that all of the weight has been removed from the platform for a finite period and then reapplied, such as occurs when one person steps off a scale and another onto the scale, before another ticket is issued.

It will therefore be seen from the above description that the nonrepeat control means for the motor 100 includes a first relay means, consisting of relay R2, connected for operation by the second switch means, consisting of the switch 82, to initiate the operation of the motor. The limit switch 109 provides the means for dropping out the relay R2 near the end of the cycle of operation. The relay R1 comprises the further control means controlled by relay R2 and the switch 82, and includes contacts R1A which prevent further operation of the relay R2 until the first switch 80 has been opened by the removal of substantially all of the weight from the scale.

It can therefore be seen that this invention provides a compact scale mechanism including a ticket issuing mechanism with a control circuit which prevents unintentional repeated operations thereof. This scale and circuit are simple in construction and operation providing long and trouble free life.

While the form of apparatus herein described constitutes a prefrred embodiment of the invention, it is to be understood that the invention is not limited to this precise form of apparatus, and that changes may be made therein without departing from the scope of the invention.

What is claimed is:

1. A ticket issuing weighing scale for issuing a ticket for each weighing on said scale, comprising a weighing mechanism, first switch means connected to be operated by said mechanism with the initial movement of said mechanism from the balance position with no weight on said scale, second switch means connected to be operated upon movement of said mechanism corresponding to a substantially greater weight on said scale than the weight required for the operation of said first switch means, a ticket issuer having a motor operable upon each energization thereof through a cycle of operation to issue a ticket, nonrepeat control means for said motor including first relay means connected for operation by said second switch means to initiate operation of said motor through said cycle of operation to issue a ticket, and further relay means controlled by said first relay means and by said first switch means and having contacts to prevent further operation of said first relay means until said first switch means has been released by the removal of substantially all of the weight from said scale.

2. A ticket issuing person weighing scale for issuing a ticket for each weighing on said scale, comprising a weighing mechanism, first switch means connected to be operated by said mechanism upon the initial movement of said mechanism from the balance position with no weight on said scale, second switch means connected to be operated upon movement of said mechanism corresponding to a substantially greater weight on said scale than the weight required for the operation of said first switch means, a ticket issuer having a motor operable upon each energization thereof through a cycle of operation to issue a ticket, nonrepeat control means for said motor including first relay means connected for operation by said second switch means to initiate operation of said motor through said cycle of operation to issue a ticket, limit switch means arranged for operation by said motor and connected to drop out said first relay means, and further relay means controlled by said first relay means and by said first switch means and having contacts to prevent further operation of said first relay means until said first switch means has been opened by the removal of substantially all of the weight from said scale.

3. A ticket issuing person weighing scale for issuing a ticket for each weighing on said scale, comprising a weighing mechanism, a first switch connected to be operated by said mechanism with the initial movement of said mechanism from the balance position with no weight on said scale, a second switch connected to be operated upon movement of said mechanism corresponding to a substantially greater weight on said scale than the weight required for the operation of said first switch, a ticket issuer having a motor operable upon each energization thereof through a cycle of operation to issue a ticket, nonrepeat control means for said motor including first relay means connected for operation by said second switch to initiate operation of said motor through said cycle of operation to issue a ticket, further relay means controlled by said first relay means and by said first switch and having contacts to prevent further operation of said first relay means until said first switch has been opened by the removal of substantially all of the weight from said scale, and delay means connected to delay the opening of said first relay means subsequent to the said opening of said first switch.

4. A ticket issuing person weighing scale for issuing a ticket for each weighing on said scale, comprising a weighing mechanism, a draft rod in said mechanism arranged to be displaced by movement to a balance position with a weight placed thereon, a pair of clips adjustably carried on said rod, a first light switch arranged to be closed by one of said clips upon initial said movement of said mechanism from a zero weight balance position, a second light switch arranged to be closed by the other of said clips upon further movement of said mechanism corresponding to a substantially greater weight on said scale than the weight required for the operation of said first switch, a ticket issuer having a motor operable upon each energization thereof through a cycle of operation to issue a ticket, nonrepeat control means for said motor including a first relay connected for operation by said closing of said second switch initiate operation of said motor through said cycle of operation to issue a ticket, switch means operated by said motor connected to release said first relay, and a further relay controlled by said first relay and by said first switch and having contacts to prevent further operation of said first relay until said first switch has been opened by the removal of substantially all of the weight from said scale.

5. A ticket issuing person weighing scale for issuing a ticket for each weighing on said scale, comprising a weighing mechanism, a first switch connected to be operated by said mechanism with the initial movement of said mechanism from the balance position with no weight on said scale, a second switch connected to be operated upon movement of said mechanism corresponding to a substantially greater weight on said scale than the weight required for the operation of said first switch, a ticket issuer having a motor operable upon each energization thereof through a cycle of operation to issue a ticket, nonrepeat control means for said motor including first relay means connected for operation by said second switch to initiate operation of said motor through said cycle of operation to issue a ticket, and further relay means controlled by said first relay means and by said first switch and having contacts to prevent further operation of said first relay means until said first switch has been opened by the removal of substantially all of the weight from said scale, and remote switch means connected to control the operation of said further relay means to disable the ticket issuing motor by blocking further operation of said first relay means.

References Cited
UNITED STATES PATENTS

| 659,292 | 10/1900 | Culmer | 177—230 |
|---|---|---|---|
| 1,385,739 | 7/1921 | Adams et al. | 177—4 |
| 2,565,431 | 8/1951 | Karp | 177—230 |
| 2,764,399 | 9/1956 | Porter | 177—12 |
| 2,791,417 | 5/1957 | Daroff | 177—245 |
| 3,037,563 | 6/1962 | Allen | 177—4 |

ROBERT S. WARD, Jr., Primary Examiner

U.S. Cl. X.R.

177—9, 12, 13, 125, 188, 230